United States Patent

Gupta et al.

Patent Number: 5,307,423
Date of Patent: Apr. 26, 1994

[54] MACHINE RECOGNITION OF HANDWRITTEN CHARACTER STRINGS SUCH AS POSTAL ZIP CODES OR DOLLAR AMOUNT ON BANK CHECKS

[75] Inventors: Om P. Gupta, Ithaca; Jack F. Bailey, Endwell; David E. Bulatek, Ithaca, all of N.Y.

[73] Assignee: Digicomp Research Corporation, Ithaca, N.Y.

[21] Appl. No.: 893,301

[22] Filed: Jun. 4, 1992

[51] Int. Cl.$^5$ .............................................. G06K 9/18
[52] U.S. Cl. ...................................... 382/11; 235/379; 235/462; 382/7
[58] Field of Search ........................... 382/1, 11, 13, 7; 356/71; 235/379, 380, 435, 439, 462

[56] References Cited

U.S. PATENT DOCUMENTS

| | | | |
|---|---|---|---|
| 2,963,220 | 12/1960 | Koston et al. | 382/11 |
| 3,033,449 | 5/1962 | Quinn et al. | 382/11 |
| 3,108,254 | 10/1963 | Dimond | 382/13 |
| 3,113,298 | 12/1963 | Poland et al. | 382/11 |
| 3,257,545 | 6/1966 | Von Berkel et al. | 382/11 |
| 3,485,168 | 12/1969 | Martinson | 382/11 |
| 3,527,927 | 9/1970 | Bijleveld et al. | 382/11 |
| 3,776,454 | 12/1973 | Jones | 382/11 |
| 4,715,622 | 12/1987 | Mikhail | 283/71 |
| 4,876,000 | 10/1989 | Mikhail | 283/71 |
| 4,998,626 | 3/1991 | Ota | 382/1 |
| 5,031,223 | 7/1991 | Rosenbaum et al. | 382/1 |
| 5,040,226 | 8/1991 | Elischer et al. | 382/7 |

OTHER PUBLICATIONS

Copy of envelope printed in Cyrillic characters.
Reid-Green, K. S., "Analysis of a Pilot Study of Machine Recognition of Handwritten Digits", 1990, Educational Testing Service, Princeton, N.J.

Primary Examiner—Joseph Mancuso
Attorney, Agent, or Firm—Salzman & Levy

[57] ABSTRACT

The present invention features a system for recognizing a string of handwritten characters automatically using a graphic input. This invention is expected to have several applications, such as affecting postal ZIP codes and the dollar amount location on bank checks. For postal applications, the device includes an identification strip for identifying the sender, a receiver, a source or a destination of material such as packages or mail. The identification strip can be part of a postage stamp, label, envelope, etc., and has a reserved region with a plurality of entry guide outlines, each designating one alphanumeric character or digit of a ZIP code. Disposed on each entry guide outline surface is a pattern that is not machine-readable. The pattern includes line segments upon which a letter, number or symbol may be inscribed. The line segment in each entry guide outline acts as a trace-over guide for the inscriber, wherein the letter, number or symbol inscribed conforms to a machine-readable character.

23 Claims, 8 Drawing Sheets

MACHINE RECOGNITION OF HANDWRITTEN CHARACTER STRINGS SUCH AS POSTAL ZIP CODES OR DOLLAR AMOUNT ON BANK CHECKS

FIELD OF THE INVENTION

The present invention pertains to a method and apparatus for recognizing a string of handwritten characters automatically and, more particularly, to a system for identifying the desired string at high speeds regardless of the string's location on a surface or the presence of surrounding obscuring graphic material.

BACKGROUND OF THE INVENTION

Sorting of mail, whether accomplished within a large company or at the post office, is an extremely labor-intensive task. In the 1960s, the United States Postal Service instituted ZIP codes to simplify the sorting process. ZIP codes have provided a means by which the destination of a piece of mail can be quickly determined, and ZIP codes are now standard throughout the nation. ZIP codes became particularly popular with bulk mailers, because they were entitled to a discount on presorted, ZIP-coded mail.

Recently, the Postal Service increased the number of digits of the ZIP code from five to nine, to provide a more detailed specification of destination. Although the new nine-digit entries are potentially more useful, they place a greater demand upon the sorting process. Obviously, the longer digit codes take longer to read and recognize, whether interpreted by human or machine.

The Postal Service continues to automate its sorting procedures and equipment. It upgraded its ability to process large-volume bulk mail (including catalogues, magazines and direct-marketing envelopes) by installing a new series of bar-code reading scanners. Bar codes are interpreted and the pieces of mail dropped into an appropriate bin. The new scanners were developed by Intermec Corporation, a division of Litton Industries. Unlike earlier postal scanners, the new units are able to read bar codes, regardless of where they are placed on the face of a piece of mail, and regardless of the orientation of the piece of mail. Although most conventional present-day scanners employ lasers, these newer scanners use a high-speed camera and an image processing computer.

While the above-mentioned scanning system is useful in the processing of bulk, bar-code imprinted mail, it is not designed to operate with ordinary pieces of mail. Ordinary mail is still processed using conventional, arabic numeral ZIP codes to perform the sorting procedure. In addition, the new equipment is far too expensive for mail room applications in all but the largest companies.

The problem with the ZIP coding of mail, however, is that not all ZIP codes are machine-readable. Most handwritten and typewritten ZIP codes still must be read by human operators. Furthermore, the low volume of mail at regional and rural post offices cannot justify the installation and use of present-day, expensive, ZIP code reading machinery to read the portion of mail which has machine-printed ZIP codes. These offices continue to use human operators to read and sort all mail.

The present invention seeks to improve the sorting procedure of mail by merging bar code technology with a simple entry guide outline, using handwritten entries of, among other information, ZIP codes. The invention allows the individual addressing a letter to indicate the ZIP code with handwritten numerals making them machine-readable. The invention, therefore, will provide a means by which the above-mentioned, new, high-speed scanners can process regular hand-addressed mail as well as bar coded bulk mail.

The invention can represent information other than ZIP codes. One such application relates to bank checks. Most personal checks are handwritten. Although bank codes, accounting and check number information is normally pre-printed in machine-readable format, the handwritten "dollar amount" information on the check has to be manually processed and entered into the computer by bank employees. Manual processing is mandatory, because bank employees are required by law to verify signatures and resolve occasional differences between handwritten and computerized dollar entries. The invention disclosed herein is expected to be applicable to automated processing of bank checks.

The invention is also expected to apply to industrial applications, including inventory control, part numbering and lot tracking. Bar codes alone are presently used for these applications, but they are awkward for use with low-volume or custom production. ZIPWrite graphics, as presented in this invention, provides a way for personnel to mark such production manually without the complications which attend current bar code marking operations. ZIPWrite graphics allows manual insertion of machine-readable ZIP code on pieces of mail. ZIPWrite is manually readable, as well as machine readable, which provides ease of transition between manual sorting and automated system processing. Therefore, the invention can be easily adapted to all modes of processing and accommodated by upgraded systems.

Although, for simplicity and clarity of exposition, subsequent discussion of the invention refers almost exclusively to mail industry operations, the invention is clearly useful in other applications.

DISCUSSION OF RELATED ART

Two sorting systems that predate the use of ZIP codes, are presented in U.S. Pat. Nos. 2,775,405 and 2,056,382. The first patent describes a "sorting stamp" that comprises a laminate having a conducting layer and an insulating layer. The user was expected to scrape away coded regions of the insulating layer to provide a partial indication of the item's destination. The invention assumes that the strip will be in the same location on all envelopes so equipment which reads the strip can find it easily. This assumption may be easily violated, resulting in unreliability. The second of the above-mentioned patents features a system for sorting what it calls a "coded envelope". Instead of the coded strip described in the first-mentioned patent, the second patent suggests a system for reading perforated or marked regions of an envelope and then sorting same. This patented system also suffers from the impediment of requiring a set orientation for scanning. Neither patent discusses a practical method for organizing the codes which its method expresses, something which would have presaged the ZIP code system itself.

In U.S. Pat. No. 3,774,758, issued to Sternberg on Nov. 27, 1973, a postage stamp is described in which five columns of digits are added. Each column contains digits zero through nine. The addressor of the mail is required to mark off five digits representing the ZIP code. The patent instructs the reader that the marked strip of the stamp would be easy to locate, because it would always be in the upper right-hand corner of the envelope. Such definitive location requirements, however, are not easily useable, and the encoded ZIP codes as described in the patent are subject to mistakes because humans cannot read them back easily.

U.S. Pat. No. 4,715,622, issued to Mikhail on Dec. 29, 1987, illustrates a postage stamp having five small boxes at its base. The postal patron enters the ZIP code into the defined boxes. The patent teaches that each stamp will have means for indicating its orientation for machine reading purposes. However, the patent does not define the method explicitly, and the written information entered into the boxes is no easer to read with a machine than hand-written ZIP codes located elsewhere on the envelope.

U.S. Pat. No. 4,876,000, issued to Mikhail on Oct. 24, 1989, is essentially the same as U.S. Pat. No. 4,715,622, with the exception that the area below the stamp contains windows for entering not one, but two ZIP codes. One ZIP code is for the destination, and the other is the sender's ZIP code. The purpose of the two codes is for the calculation of postage. This patent suffers from the same limitations as the earlier Mikhail patent.

U.S. Pat. No. 4,998,626, issued to Ota on Mar. 12, 1991, recognizes the problem of trying to read written information by machine. This patent suggests a way to separate handwritten envelopes from those containing machine-printed information so they may be interpreted by human operators.

In a "System and Method for Deferred Processing of OCR Scanned Mail", disclosed in U.S. Pat. No. 5,031,223, issued to Rosenbaum on Jul. 9, 1991, an upgraded sorting system is suggested for the Postal Service. The system uses optical character-recognition technology to scan the bottom line of an address to determine the mail's destination. Bar code equipment is used to mark each piece of mail with a machine-readable serial number. An image capture-and-compression system saves local, digitized images of each item before transporting the mail to its destination. The patent suggests using the mail transit time to analyze the exact destination address (including street and house number) using the previously acquired data. Human operators are still used to sort handwritten items.

It can be seen from the aforementioned patents that a system is required for recognizing handwritten information presented on a piece of mail. The problem of recognizing handwritten characters is the same, whether those characters represent either ZIP codes or other information, such as the dollar amount on personal bank checks. Therefore, a system that can read ZIP codes will also be able to read the dollar amount on bank checks in an efficient manner.

It would be advantageous to provide a system capable of reading either a handwritten or a machine printed ZIP code.

It would also be advantageous to provide a system that also permits humans to read the ZIP code easily.

It would also be advantageous to integrate the postal service ZIP code field with other information.

SUMMARY OF THE INVENTION

In accordance with the present invention, a method and apparatus are provided to recognize manually inscribed character strings such as ZIP codes or dollar amount on bank checks. There is provided a mechanism for processing and sorting postal items, using an identification strip of graphic to allow handwritten ZIP codes to be used with machine vision systems. The graphic comprises an identification strip for identifying the sender, the recipient, the source or the destination of mail. The identification strip can be part of a postage stamp, label, envelope, etc., and comprises an indicia field having a plurality of entry guide outlines, with each designating a single character. Disposed on each entry guide outline surface is a pattern such as the seven-segment outlines in digital displays. The line segments in each entry guide outline act as a guide for the inscriber, whereby the letter, number or symbol inscribed conforms to a machine-readable character. The segments act as an entry guide that conforms the handwritten inputs to optical recognition techniques. The ZIP code numeral entry guide outlines are surrounded by bar codes and a system of fiducial marks for quickly locating and aligning the entry guide outlines for machine recognition thereof. This multiple field identification strip is herein referred to as ZIPWrite. The application of the graphic of the invention is not limited to ZIP code or handwritten entries. Rather, other code data may be printed or inscribed for addressing mailpieces within a company or a public facility. In addition, the same graphic can be used to indicate the dollar amount on bank checks to facilitate their automated processing.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention uses a combination of technologies innovatively to be able to machine read handwritten characters. A string of such characters could be formed for various applications such as ZIP codes in mail industry, dollar amount on bank checks or parts/lot identification in manufacturing applications. So it must be recognized that although the applications of the invention taught herein are varied, for the sake of clarity the embodiment discussed below describes the embodiment in the context of a postal application. The embodiment could be transferred easily to several other applications.

The invention, in part, consists of a graphic composed of several fields containing bar codes, character fields and fiducial marks, and is termed "ZIPWrite". The graphic can be part of an item such as a postage stamp, address label, or other postal items for transmittal of mail within a system. An identification strip is provided for identifying the sender, recipient, source or destination of mail. The identification strip comprises an indicia field having a plurality of entry guide outlines, each designating one character of a zip code. Disposed on each entry guide outline surface is a pattern of line segments upon which a letter, number or symbol may be inscribed by the sender of the mail item. The line segments in each entry guide outline act as a tracing guide for the inscriber, whereby the letter, number or symbol inscribed conforms to a machine-readable character. In this manner, the line segments act as an entry guide that conforms the handwritten input to processing by optical scanning techniques. Furthermore, the characters thus inscribed are easily understood by humans, as well.

It should be noted that inscribed characters formed with the aid of entry guide outlines may also be printed in similar digital-segment formats by machines such as laser printers or typewriters having specially-designed fonts. The character recognition and processing system described in this invention are also useful in processing such printed characters.

Figure 1A:
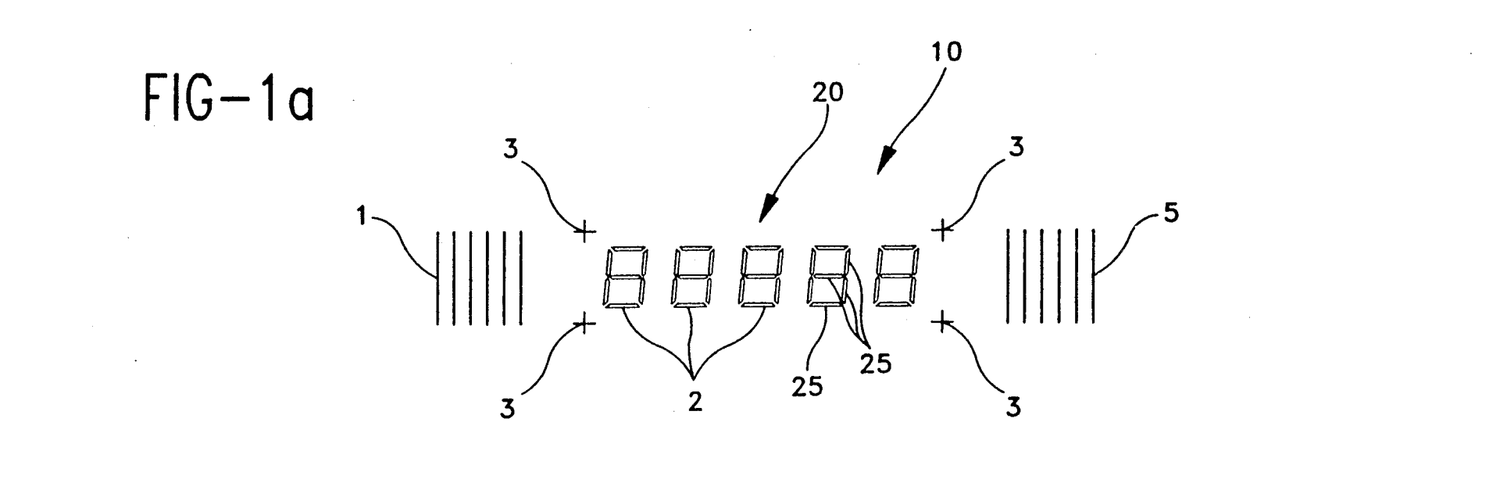
FIGS. 1a through 1e comprise five respective graphic views of ZIPWrite entries that are machine-readable. Each view represents an embodiment of a ZIPWrite entry disposed on a mailpiece. Each ZIPWrite entry can be used for automated sorting of mailpieces.

Now referring to FIGS. 1a through 1e, several embodiments of the basic ZIPWrite graphic are illustrated. FIG. 1a shows a basic ZIPWrite graphic 10. The ZIPWrite graphic 10 comprises two vertical "picket fence" markings 1 and 5, respectively, representing bar-coded information. The markings 1 and 5 are respectively disposed at the left and right ends of a reserved region 20 comprising five entry guide outlines 2. The reserved region 20 is a region for input of handwritten information. The right-hand bar code markings 5 contain a coded value that is the same for all ZIPWrite graphics and represents the end of the ZIPWrite graphic. In other words, it indicates that no more reserved regions will follow to its right. The left-hand bar code marking 1 contains a coded value that indicates the format of the reserved region 20. The bar code markings 1 and 5 help to quickly locate the reserved region 20.

At the corners of the reserved region 20 are disposed fiducial marks 3. The fiducial marks 3 simplify the process of precisely determining the orientation, size and location of the reserved region 20. These fiducial marks 3 are particularly useful when the entry guide outlines 2 are not horizontal with respect to the scanning equipment.

As shown in FIG. 1a, the fiducial marks 3 are crosshair characters, but in alternate embodiments, other recognizable token shapes may denote specific information about the organization of material within the reserved region. For example, cross-hair fiducial marks indicate that the reserved region contains numerals, while target-shaped fiducial marks might indicate alphabetic characters. However, the value of the left bar code symbol 1 can make the same distinctions. Using the left bar code symbol 1 is preferable because it relieves the system of complications which the use of more than one fiducial mark format entails.

Each entry guide outline 2 comprises a set of seven line segments 25. The line segments 25 are entry guides for the placement of handwritten entries. The line segments 25 are lightly printed (i.e., half-tone or 50% screen printed images) or appear in an easily filtered color not commonly used with pens, pencils, or label printing (e.g., pale orange). The segments 25 are meant to receive the inscription of handwritten letters, numbers, symbols, etc., but the segments do not appear in an electronic image used during character recognition because of the special printing technique used to produce them. The characteristic of entry guide outline 2 as seven line segments 25 will be recognized as the familiar seven segments of digital displays used in watches and other electronic devices. These displays are easily read by humans.

Appropriate segments of these seven line segments 25 can be over-inscribed to generate any and all of the digits from zero through nine. These seven segment digits are easily and more accurately recognizable and readable by machine. In this fashion, tracing over or over-writing some or all of the lightly printed lines 25 of each entry guide outline 2 is used to handwrite ZIP code numbers that are easily recognized by machine. Even where the ZIPWrite graphic is not machine-read, there will be fewer human errors due to the LCD-type, digital numerals of the present invention, which can be easily read by humans.

Figure 1B:
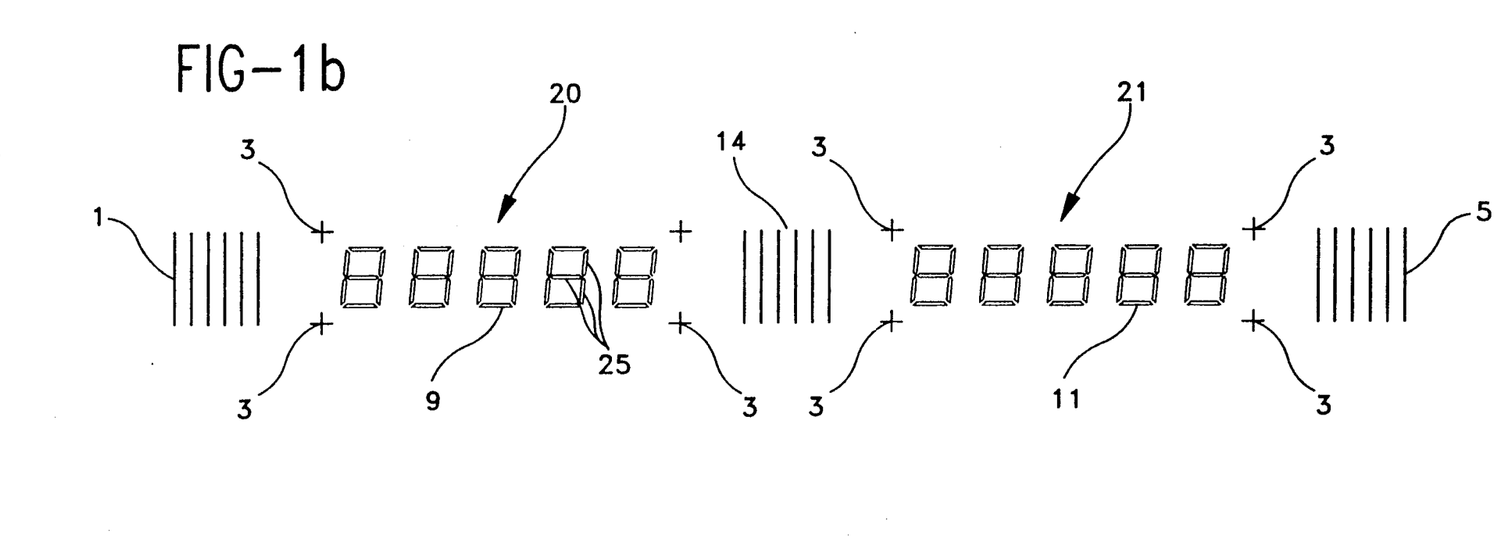

Referring to FIG. 1b, a third bar code symbol 14 is added in this embodiment, creating space for a second reserved region 21. One of the most important features of the bar codes 1 and 5 is that bar code scanners can easily isolate and identify bar codes from the confounding clutter of nearby material. It is this feature of the bar code which is employed in the present invention. The values of the bar codes indicate whether a field or region 20 carries a five digit ZIP code, the trailing four digits of a nine digit ZIP code, or any additional trailing digits or characters of extended codes that may be designed to further address the mailpiece, as may be appropriate in a large organization. The value of the bar codes can also be used to indicate the licence number granted to an individual or a company authorized to print the graphics on mail items, such as envelopes and labels.

In this embodiment, the bar code 1 identifies the reserved region 20, while the middle bar code 14 identifies the added reserved region 21. Bar code markings 1 and 14 together, by drawing an imaginary line through them, are also used to determine the approximate orientation of reserved fields 20 and 21. The respective fiducial marks 12 and 13 are used to locate and orient reserved fields 20 and 21 precisely.

Figure 1C:
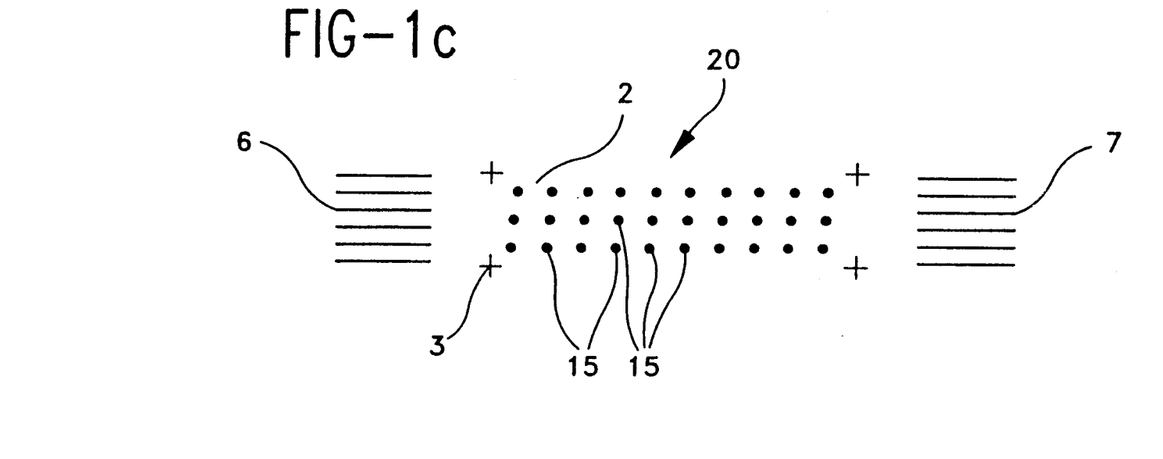

Referring to FIG. 1c, the reserved region 20 comprises entry guide outlines 2 having a series of dots 15, replacing the lines 25 shown in FIG. 1a. The dots 15 represent the end points of the lines 25. The inscriber of the ZIP code is instructed to connect the dots 15 in this embodiment to provide the numerical digits of the destination. This FIGURE also illustrates the use of stepladder bar-code markings 6 and 7, which are horizontally-oriented lines.

Figure 1D:
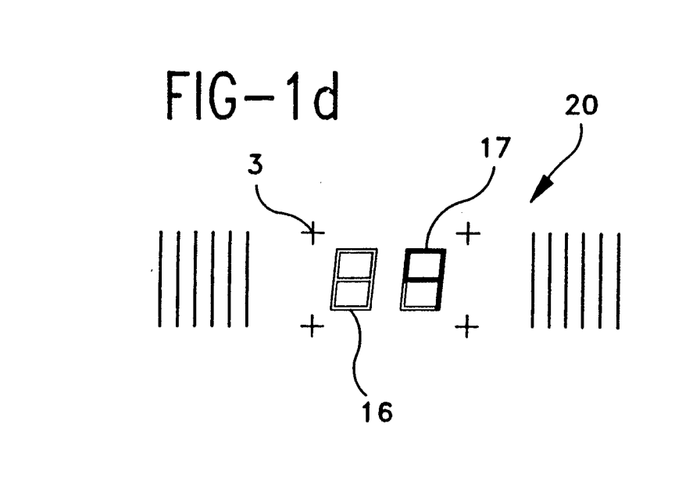

Referring to FIG. 1d, a monochrome printing format for the reserved region 20 is illustrated. Hollow or outline segments 16 are filled in by the sender to produce letters, numbers, symbols, etc., as depicted by entry guide outline 17, which has been filled in, in this illustration, to provide the numerical designation "9". The advantage of outline segments is to ensure that the user not exceed the borders within the field or region 20.

Figure 1E:
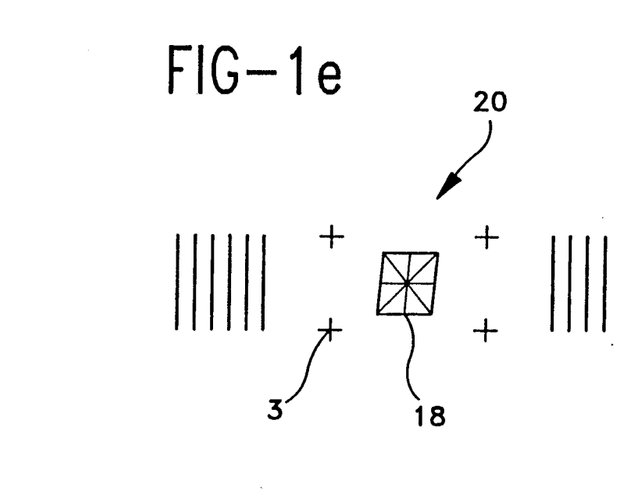

Referring to FIG. 1e, the window 18 of the reserved region 20 comprises a pattern of lines representing a "British flag" pattern 18, which contains sixteen line segments instead of the seven provided in entry guide outline 2 of FIG. 1a. In this embodiment, the entry guide outline segment 18 is more versatile in providing an entry guide for symbols, alphanumerics and alphabetics, as well as for numbers.

It should be understood that the essential character of the invention is unchanged even when one of its three basic components is not included. For example, a ZIPWrite graphic may have a reserved region surrounded with bar codes, but which has no fiducial marks. Such a graphic requires processing with sufficient speed and sophistication to locate the reserved region without the operational simplification which fiducial marks provide. Similarly, another possible ZIPWrite graphic implementation might lack bar codes if an image processor can locate the remaining fiducial marks easily enough to be practical. An example may be bank checks, since all of the checks are the same size and the reserved regions will always be found in the same physical location. Furthermore, in some situations with suitable scanning technology, the fiducial marks might themselves be miniature bar codes.

The entry guide outlines used in the reserved region are useful today because of the limitations of existing optical character recognition systems. Although some day, more sophisticated character recognition systems will read all varieties of handwritten and machine-printed material reliably, obviating the need for entry guide outlines, the problem will remain of distinguishing desired information from similar (and possibly confounding) text or numbers found amid neighboring material. Bar codes in combination with fiducial marks, or even bar codes alone, will still provide a way to locate the desired information, distinguishing its contents from other numbers or characters which may be part of the address or other nearby printed or handwritten material.

Figure 2:
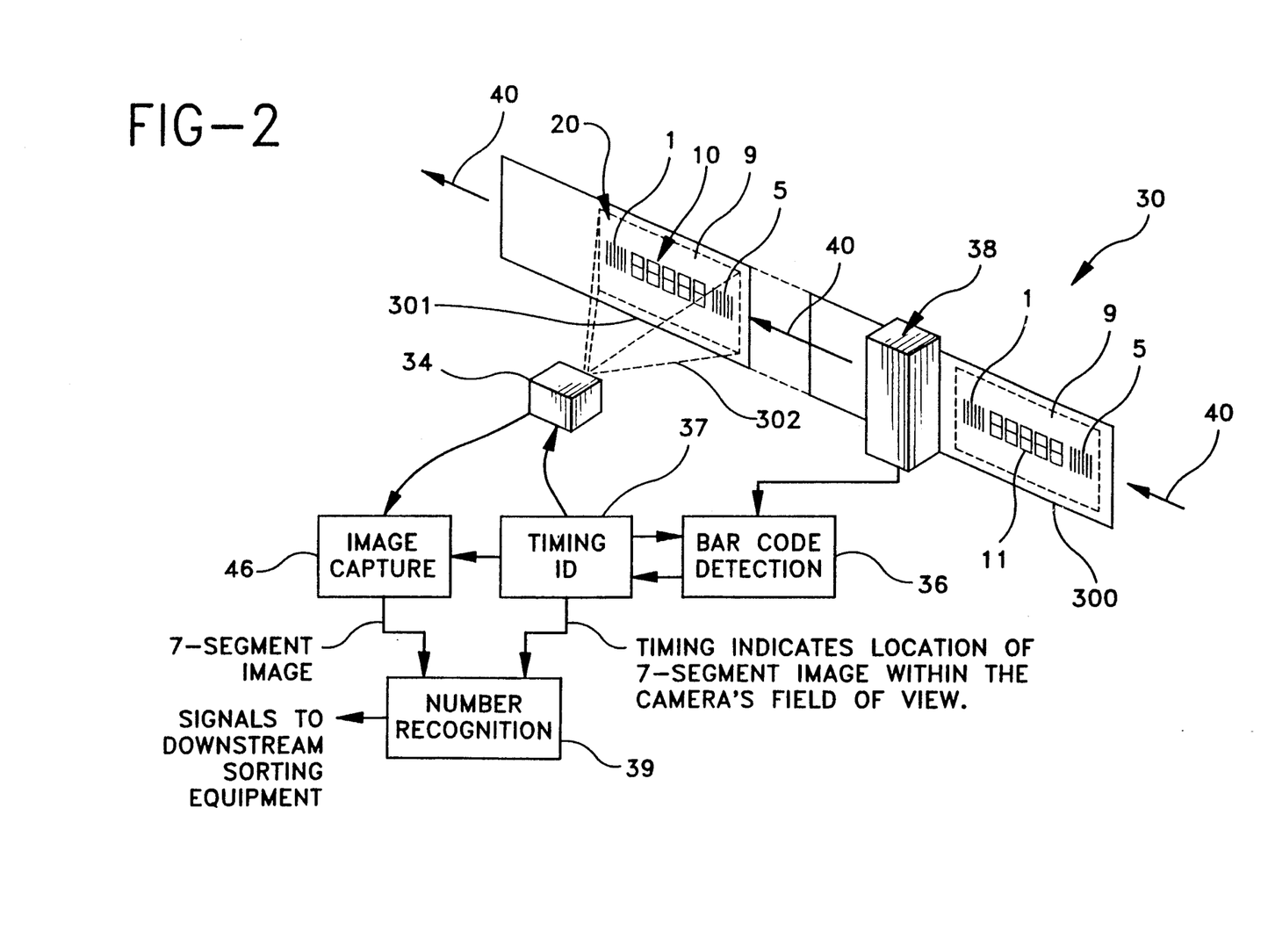
FIG. 2 is a schematic diagrammatic view of a system for reading the ZIPWrite entries, illustrated in FIGS. 1a through 1e, that are disposed on a mailpiece.

Referring now to FIG. 2, operations may be more evident upon consideration of the steps which a machine vision system takes to recognize characters written on a surface. In practice, converting a ZIP code on an envelope into a representation within a computer involves at least two basic operations: finding the ZIP code and extracting it.

The first step is simply finding the ZIP code amid the welter of confounding handwritten and printed material which might appear on an envelope or package. ZIP codes are merely a string of digits. Although they are easy for people to recognize on an envelope, their very simplicity makes it difficult for computer programs and hardware to discern the desired string of numerals from nearby patterns which are very similar but which are actually useless clutter or unrelated information. The ZIPWrite graphic provides a practical way for machinery to distinguish between the real ZIP code and distracting material.

Once the machine vision system has located the ZIP code, the next step is to interpret its value. As mentioned hereinabove, present day optical character recognition systems cannot be relied upon to read handwritten characters.

The end result of the recognition process is a string of numbers and/or letters (e.g., ZIP codes). In postal applications, a representation of ZIP codes drives sorting machinery downstream, such as conventional postal service sorting equipment based on bar code markings. The process begins with detection of the bar codes 1 and 5 which appear at either end of a ZIPWrite graphic 10 and possibly at intervals within it as well. The discussion which follows uses a simple two bar code ZIPWrite graphic as an example, but extension to ZIPWrite graphics having three or more bar codes is obvious to anyone familiar with the art of bar code reading. Bar code detection controls the operation of a camera 34, triggering capture of an image 302 of the ZIP code on a mailpiece 9. Once the image is digitized and committed to electronic memory 46, image processing software first uses the fiducial marks to locate the ZIPWrite reserved region 20 precisely within the considerably larger image 302 captured from the mailpiece 46, and then converts information found within the reserved region 20 into internal machine representations. A more detailed description of these operations appears hereinbelow.

A single envelope 9 (shown in two positions 300 and 301 in FIG. 2) passes by a bar code reader 38. The bar code reader 38 and its bar code detection function 36 detect the vertical position on the envelope 9 of the left bar code symbol 1 of a two-symbol ZIPWrite graphic 11, and with the aid of the timing control function 37, its time of passage. A moment later, the system measures the vertical position and time of passage of the ZIPWrite graphic's trailing right bar code symbol 5.

Figure 3A:
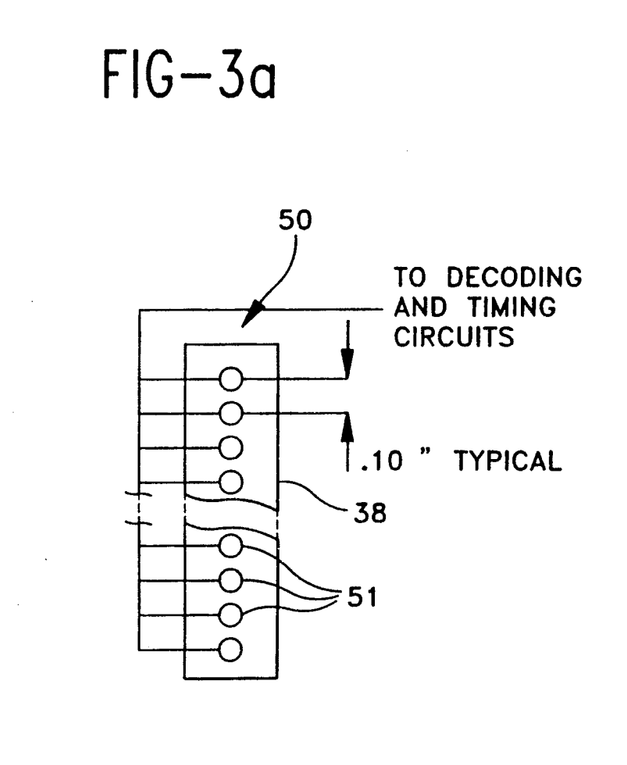
FIGS. 3a through 3c depict schematic views of the method by which the bar code of the ZIPWrite graphic, illustrated in FIGS. 1a through 1e, can be read.

The bar-code reader technology is quite advanced and can be implemented in one of several ways. In one such implementation, referring now to FIG. 3a, a detail of the bar code reader 38 is shown, using a row 50 of stationary fixed beam readers 51. Each of these has an approximate depth of field of 0.5" and can scan at rates of up to 200" per second, which is adequate for reading bar codes on moving envelopes or packages. For purposes of discussion, the distance between individual readers 51 is assumed to be 0.10". Each reader 51 in the row 50 has its own bar code detection hardware, which passes a value to the bar code detection circuit 36 (FIG. 2) whenever it detects a valid bar code 1 or 5.

Figure 3B:
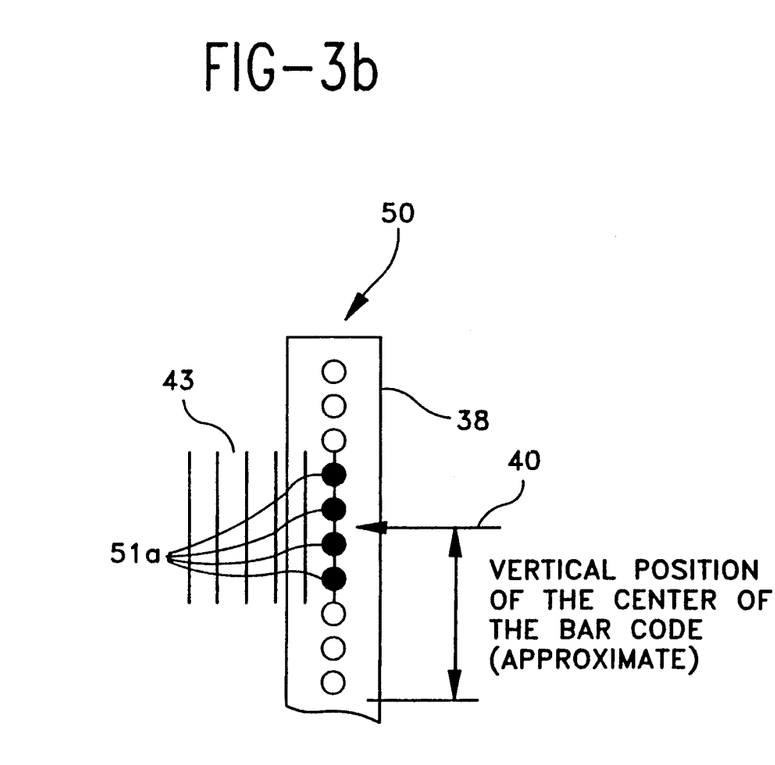

The number of readers 51 which respond to a passing bar code 1 depends on the dimensions of the bar code and the degree to which it is skewed from horizontal. For example, a bar code 43 which is half an inch high and which is not skewed from horizontal typically produces successful reads from four of the readers 51a (FIG. 3b). When the bar code 43 is not skewed, all four detections 51a occur simultaneously. The four successful detectors 51a indicate the bar code's approximate vertical position and width.

Figure 3C:
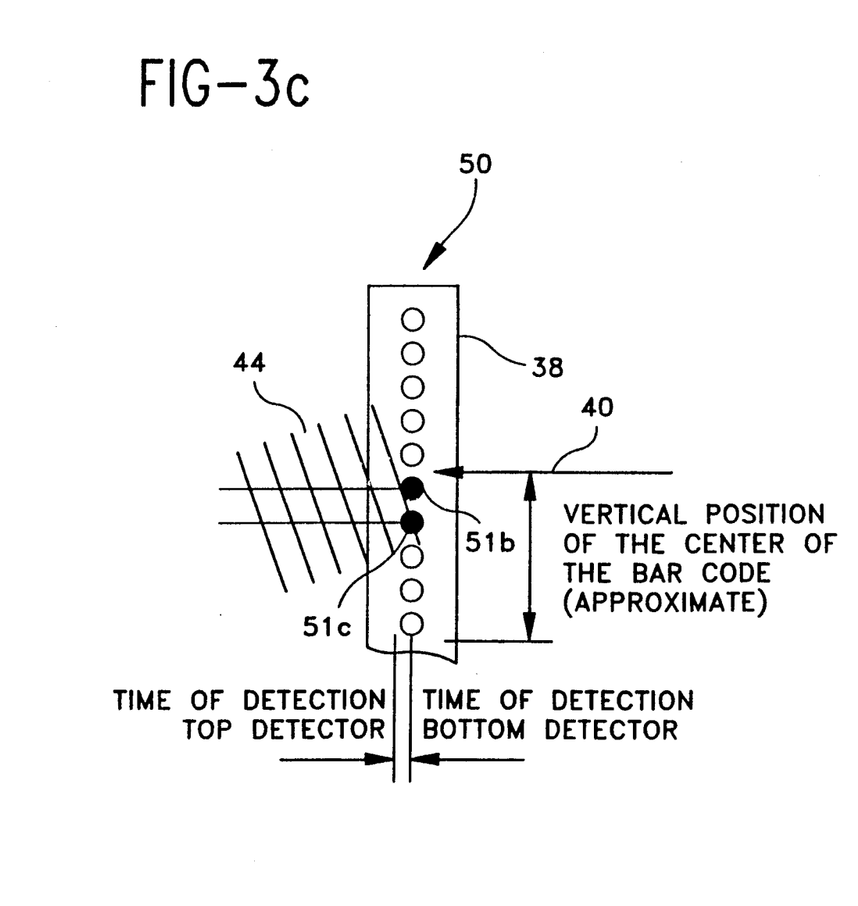

If the bar code 44 is skewed (FIG. 3c) fewer detectors read the bar code successfully. FIG. 3c shows only two detectors (dark spots) 51b and 51c completing successful reads; although parts of the bar code 44 pass beneath six detectors, only two of them (51b and 51c) scan the complete sequence of bars. Of the two successful detectors 51b and 51c, the top detector 51b completes its scan slightly ahead of the bottom detector 51c. This provides a measure of the degree of skew. The order of the times of detection indicate whether the skew is clockwise or counterclockwise.

In practice, there is no need to use the individual times of detection to measure skew. A practical bar code detection circuit 36, instead, simply averages the individual times of detection, calculates the approximate vertical position of the first bar code 1, and awaits the arrival of the second (rightmost) bar code 5. When the second bar code 5 arrives, the bar code detection circuit 36 generates a second set of time and vertical distance measurements. After the right bar code symbol 5 has passed the bar code reader 38, the system has determined two time values, indicating the time of each bar code's passing. Two vertical position values are also derived, which indicate the approximate vertical location of each detected bar code. If the vertical position values are not equal, the ZIPWrite graphic is skewed from horizontal. The value of the left bar code 1 indicates the format of the reserved region 20 between the two bar codes, and the value of the right bar code 5 indicates "end of scan".

Combining these time, vertical position and bar code values with the known constant envelope velocity, the system can calculate the approximate distance between the bar codes 1 and 5 and the tolerances associated with their positions. With the dimensions and tolerances known, the system can also calculate the areas of the image where it can expect to find the fiducial marks. However, these values are not useful until the system creates a digitized image of the ZIPWrite graphic. Because the velocity of the mailpiece 9 is constant, the interval between the system detecting passage of the left bar code symbol 1 and the ZIPWrite graphic falling within the field of view of the camera 34 also is constant. The timing ID circuit 37 waits for the letter 9 to reach position 13. At that moment, the timing ID circuit 37 "freezes" the image within the camera's field of view with a strobe signal. The camera passes the video image to the image capture circuit 46, which converts it to digital form 39 suitable for subsequent image processing.

The captured image 46 represents an area of the envelope 9 which is considerably larger than the ZIPWrite graphic 10 itself, so the system uses the pairs of vertical position and time values taken earlier to find the ZIPWrite graphic's approximate location within it. The position and time values captured earlier pass to the number recognition function 39, which uses them to find the reserved region of the ZIPWrite graphic 10 even when it is skewed from horizontal. Different bar code reader technologies provide different vertical position accuracies, but generally, the more accurate technologies reduce the areas of the captured image within which the number recognition system must search for the ZIPWrite fiducial marks.

ZIPWrite fiducial marks 3 (FIGS. 1a-1e) provide a final alignment mechanism. Although the number recognition system 39 nominally requires only two fiducial marks 3 to locate the reserved region 20 precisely, the ZIPWrite graphic 10 provides extra fiducial marks 3 both for redundancy and to allow direct determination of the height and width (aspect ratio) of the reserved region 20.

The entry guide outlines 2 will be printed on the letter or package 9 in a way which prevents them from appearing in the captured image 46. This can easily be achieved by printing the outlines in colors that are easily filtered during the image-capturing process. The bar code symbol 1 to the left of the reserved region 20 indicates their format and the fiducial marks 3 indicate their aspect ratio and precise locations. With the reserved region 20 and entry guide outline locations known accurately, it is a relatively simple matter to examine the patterns provided by the sender or a machine. Once the fiducial marks 3 are located, the number recognition system 39 determines exactly where each entry guide outline 2 appeared on the original address and where it falls within the digitized image.

Figure 4:
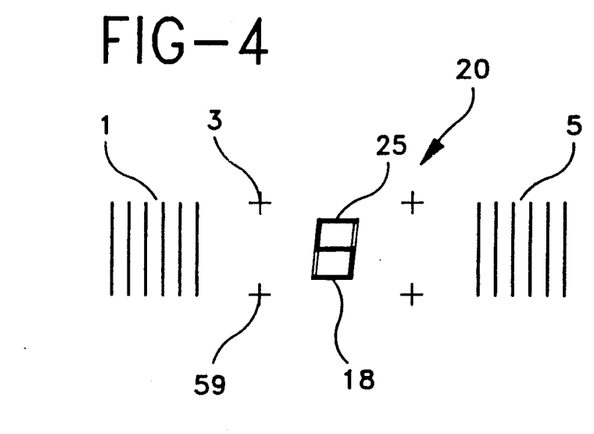
FIG. 4 depicts the relatively small regions within which the number recognition function is guaranteed to find the ZIPWrite fiducial marks.
Figure 5:
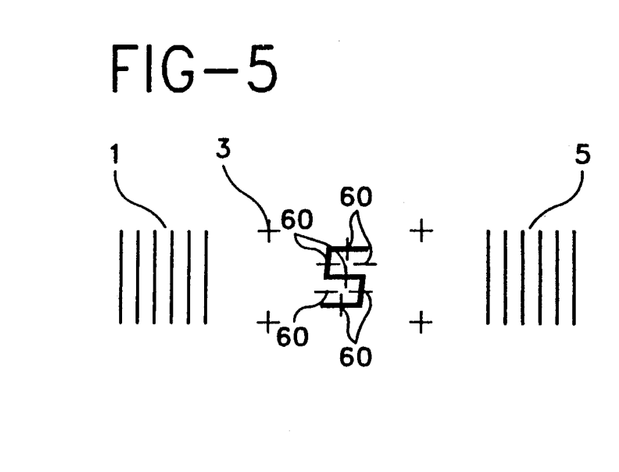
FIG. 5 illustrates an enlarged view of the graphic shown in FIG. 4, with a slightly skewed orientation.

FIGS. 4 and 5 illustrate an algorithm suitable for recognizing numerals when a conventional computer implements the number recognition function 39. FIG. 4 shows the region 20 of a captured image which corresponds to a single-digit ZIPWrite graphic. The entry guide outline does not appear in the image, leaving only the digit "5", which the user entered. The line segments of the ZIPWrite entry guide outline do not appear in an electronic image used during character recognition, because of the special printing technique used to produce them. The image capture system 46 suppresses the entry guide outline 2, leaving only the bar codes 1 and 5, the fiducial marks 3, and the user's entry.

The areas 59 which surround each fiducial mark 3 indicate regions within which the computer is guaranteed to find the fiducial marks. The actual size and shape of the areas 59 will differ with the height of the bar codes and the distance between them. The computer can determine the exact size and skew from horizontal of the reserved region 20 by finding any three of the fiducial marks 3.

With the reserved region's size and orientation known accurately, the number recognition function 39 executes a simple, effective algorithm to determine the value of the digit which the sender entered in the now-invisible entry guide outline. The number recognition function 39 determines the exact location and size of the entry guide outline 2 because the left bar code symbol 1 denotes the format of the reserved region 20.

FIG. 5 shows the same digit "5" drawn slightly larger with indications of the seven short paths 60 through the image that the computer examines to distinguish the digit's value. Each path of examination runs perpendicular to one of the seven segments 25 of the original entry guide outline 2, which does not appear in the image. If the computer finds a dark region within one of the paths, it sets a flag which indicates that the corresponding segment is dark. When it has examined all seven paths, it compares its flags with stored values (Table I) which indicates the pattern or patterns of segments which represent each digit. In Table I, some digits are represented with more than one pattern of segments.

TABLE I

| | | Segment Values | | | | | |
|---|---|---|---|---|---|---|---|
| Digit | Top | Upper Right | Lower Right | Middle | Upper Left | Lower Left | Bottom |
| 0 | X | X | X | | X | X | X |
| 1 | | X | X | | | | |
| 1 | | | | | X | X | |
| 2 | X | X | | X | | X | X |
| 3 | X | X | X | X | | | X |
| 4 | | X | X | X | X | | |
| 5 | X | | X | X | X | | X |
| 6 | | X | X | X | | X | X |
| 6 | X | X | X | X | | X | X |
| 7 | X | X | X | | | | |
| 7 | X | X | X | | X | | |
| 8 | X | X | X | X | X | X | X |
| 9 | X | X | X | X | X | | |

TABLE I-continued

| Digit | Top | Upper Right | Lower Right | Middle | Upper Left | Lower Left | Bottom |
|---|---|---|---|---|---|---|---|
| 9 | X | X | X | X | X | | X |

A flag pattern which does not appear in this table indicates an unreadable digit. This simple algorithm works with either the halftone "disappearing" entry guide outlines 2 (FIGS. 1a and 1b) or 16 (FIG. 1d) or the simpler six dot entry guide outline 15 (FIG. 1c). The algorithm may be extended to the "British flag" entry guide outline 18 (FIG. 1e) or its nine-dot counterpart (not shown) to recognize alphanumeric characters. The algorithm may be made more immune to spurious or errant line placement by a variety of techniques well known to anyone skilled in the art of image recognition.

The embodiment expressed above is useful for explaining the invention, but it is not the only one possible. Several available technologies are available for the bar code reader alone, including line scan cameras, flying spot scanners, starburst scanners or a special image area camera. Some make the camera 34 (FIG. 2) unnecessary.

ZIPWrite's precise determination of numerals or characters within the reserved region or regions 20 creates a wide range of implementation possibilities for the number recognition function 39. ZIPWrite makes it possible to pass individual characters to separate processors to perform fast parallel image processing. Although a conventional computer architecture can perform acceptably, some may prefer the implementation of the number recognition function 39 with a neural network.

Figure 6:
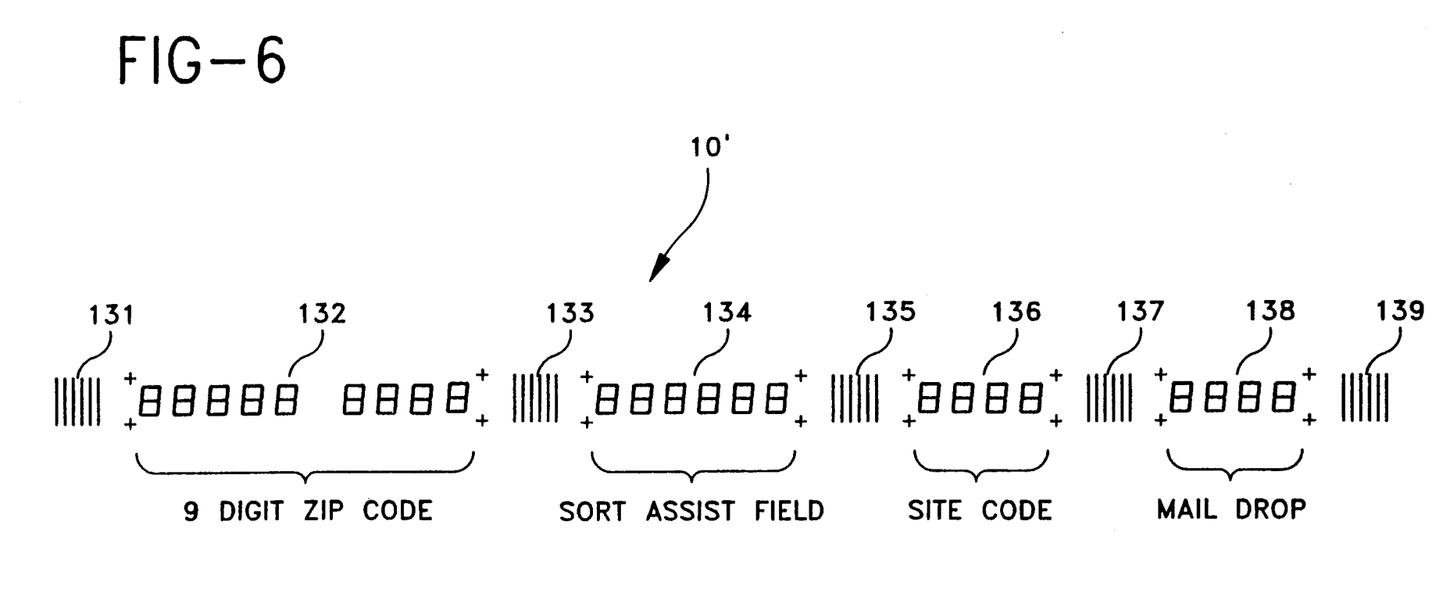
FIG. 6 shows an alternate embodiment of the graphics depicted in FIGS. 1a through 1e, wherein the graphic is extended, having several separate information fields.

Referring to FIG. 6, an extended ZIPWrite graphic 10' is illustrated, which is useful in sorting mail within companies or other large facilities. The various sites, buildings or plant locations within the company property can be determined by the reserved region 136. The particular mail drop within the building can be determined by the reserved region 138. The nine-digit ZIP code, represented by the reserved region 132, will direct the mail to a special postal station and area reserved for that company. A sort assist field, represented by reserved region 134, will provide additional sorting capability. Each of the reserved regions 132, 134, 136 and 138 is bounded by its own bar codes 131, 133, 135, 137 and 139, respectively, to provide the format and end of scan information needed for processing. Once the value of the ZIP code is recognized by the machine, as described above, it can drive the sorting machines similar to those used presently to sort mail items that bear bar code markings placed on bulk mail.

The ZIPWrite graphics of this invention can be attached or printed upon postage stamps, or may be used upon separate labeling, or may be printed upon wrapping, packages and envelopes. Since the possibilities are many, the invention's application should not be interpreted as being limited to any one type of postal item or vehicle.

Figure 7:
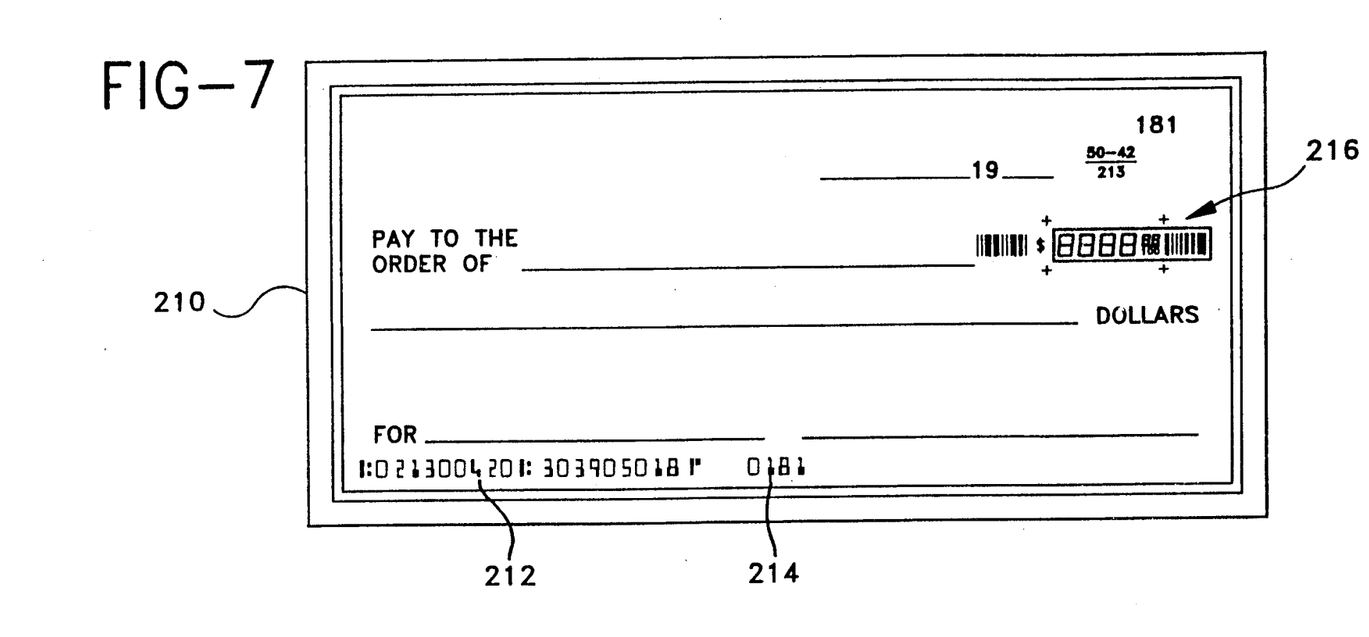
FIG. 7 shows the application of graphics as applied to bank checks.

The application of the entry guide graphics in the banking industry is shown in FIG. 7 in the form of a personal check 210. Although bank codes 212, accounting and check number information 214 is normally preprinted in a machine-readable format, the handwritten dollar amount information on the check, shown in the area defined by reference numeral 216, must be manually processed.

Figure 8:
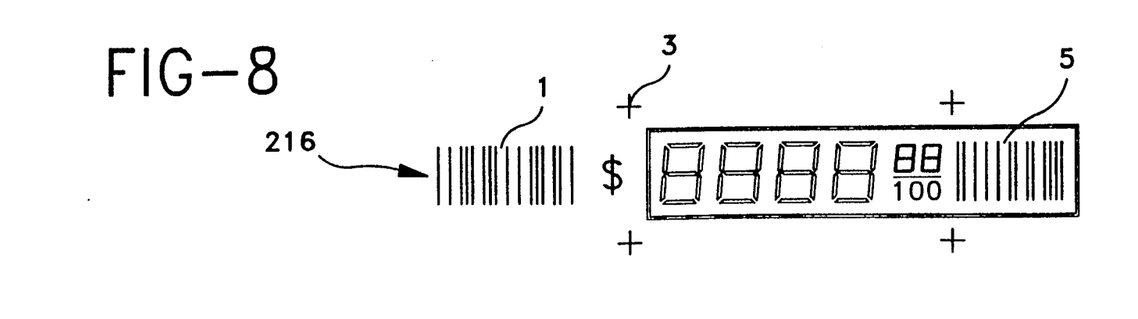
FIG. 8 depicts a portion of a bank check, showing the graphic on an enlarged dollar value region thereof.
Figure 9:
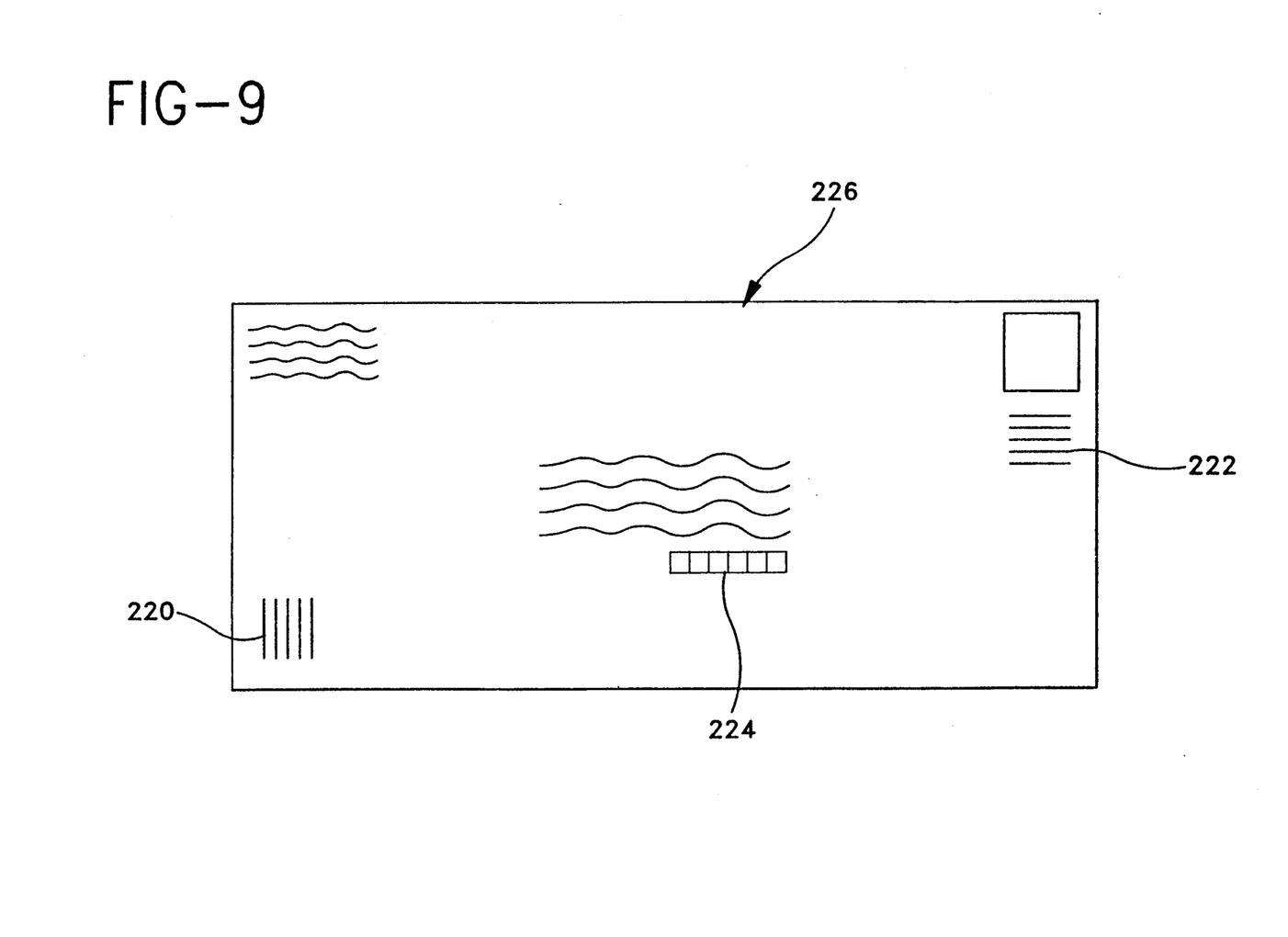
FIG. 9 depicts reserved regions randomly spaced apart from the ZIPWrite graphic.

FIG. 8 is an expanded view of the graphic 10 as applied to the region 216 where the dollar amount information is entered. Bar codes 1 and 5 can be used to indicate the number of digits in the dollar region 216. The recognition algorithm described hereinabove for recognizing the character strip representing ZIP codes could also be used to read the dollar value on the check 210. The invention presented herein is meant to be applicable in combination with, as well as independent of, the surrounding bar codes 1 and 5 and fiducial marks 3. A good example of this is the use of the system with bank checks described above. Since bank checks are all the same size, the bar codes and/or fiducial marks used to locate and align the "dollar amount" region 216 on the check 210 may be omitted. Once the value of the dollar amount is recognized on the check, it may be used to process the appropriate bank accounts for credit and/or debit. FIG. 9 depicts reserved regions 220 and 222, either one or both of which can be used to locate the ZIPWrite graphic 224 on the envelope 226.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by LETTERS PATENT is presented by the subsequently appended claims.

What is claimed is:

1. An item having identification means for accepting handwritten or printed characters, said identification means including a plurality of entry guide outlines forming a string and disposed upon a surface of said item in a random location thereon, with respect to said string, the identification means comprising means disposed in each of aid plurality of entry guide outlines that includes a pattern that is not machine-readable, said pattern having line segments for receiving a hand or printed inscription upon at least one of said line segments in at least one entry guide outline of said identification means, said inscription providing a machine-readable, as well as manually-readable, pattern representing identification information such as a letter, number or symbol, whereby said item containing said identification means has an increased facility to be automatically processed, each of said plurality of entry guide outlines in said string providing means to enter any numeral from zero to nine, a symbol or letter within the respective entry guide outline segments of said string, whereby a code, an identification or value can be entered.

2. The item of claim 1, wherein said plurality of entry guide outlines form a reserved region, and further wherein said reserved region comprises bar code markings.

3. The item of claim 2, wherein said reserved region comprises a site code.

4. The item of claim 2, wherein said reserved region comprises a sort assist field.

5. The item of claim 2, wherein said reserved region comprises fiducial markings.

6. The item of claim 5, wherein said item comprises a mailpiece.

7. The item of claim 6, wherein said reserved region comprises a ZIP code.

8. The item of claim 6 comprising a postage stamp having a surface upon which said identification means is disposed.

9. The item of claim 6 comprising a postage label having a surface upon which said identification means is disposed.

10. The item of claim 6 comprising an envelope having a surface upon which said identification means is disposed.

11. The item of claim 1, comprising a wrapping having a surface upon which said identification means is disposed.

12. The item of claim 1, wherein said plurality of entry guide outlines form a reserved region, and further wherein said reserved region comprises fiducial markings.

13. The item of claim 7, wherein said reserved region comprises a mail drop.

14. A system for recognizing handwritten or printed characters automatically, said characters comprising a graphic input disposed on an item, said graphic input comprising a machine-readable, handwritten or printed code device at a random location thereon, the code device comprising a reserved region and means for facilitating the location thereof, said reserved region being adapted to receive a manually-entered and manually-readable character string, such as letters, numbers or symbols, corresponding to machine-readable characters, said characters being individually formed to provide a string of numerals, including a plurality of entry guide line segments disposed in said string, each entry guide line segment providing means for entering any numeral from zero to nine, a letter or symbol therein, whereby a code, an identification or value can be entered.

15. The system in accordance with claim 14, wherein said means for facilitating location of said reserved region comprises bar code information.

16. The system in accordance with claim 15, wherein said reserved region comprises a plurality of entry guide outlines, each designating one character of a code, each entry guide outline having a surface containing a pattern that is not machine-readable, said pattern comprising line segments and acting as a trace-over guide.

17. An item-processing system comprising;
at least one item to be processed, said item having identification means comprising a plurality of entry guide outlines for accepting handwritten or printed identifying information, said identification means disposed upon a surface of said item, the identification means comprising means disposed in each of said plurality of entry guide outlines that includes a pattern that is not machine-readable, said pattern having line segments for receiving a hand or printed inscription upon at least one of said line segments in at least one entry guide outline of said identification means, said inscription providing a machine-readable, as well as a manually-readable, pattern representing identification information such as a letter, number or symbol, each of said plurality of entry guide outlines forming part of a string of individual numerals, letters or symbols, each of said plurality of entry guide outlines providing means to enter any numeral from zero to nine, a symbol or letter within the respective entry guide outline segments of said string, whereby a code, an identification or value can be entered, said identification means further comprising a reserved region disposed on said item at a random location relative to said plurality of entry guide outlines;

b) means for detecting and recognizing a handwritten or printed character string disposed on said item;

c) means for analyzing information contained in said character string; and d) processing means operatively connected to said means for analyzing information, said processing means being adapted to operate under the control thereof and to process said at least one item in response thereto.

18. The item processing system of claim 17, wherein said reserved region comprises bar code information.

19. The item-processing system of claim 18, wherein said reserved region comprises fiducial markings.

20. The item-processing system of claim 18, wherein said reserved region comprises a ZIP code.

21. The item-processing system of claim 20, wherein said processing means further comprises means for sorting said item based on said analyzed information.

22. The item-processing system of claim 18, wherein said item has disposed thereon a postage label having a surface upon which said identification means is disposed.

23. The item-processing system of claim 18, wherein said item comprises an envelope having a surface upon which said identification means is disposed.

* * * * *